United States Patent Office 3,451,710
Patented June 24, 1969

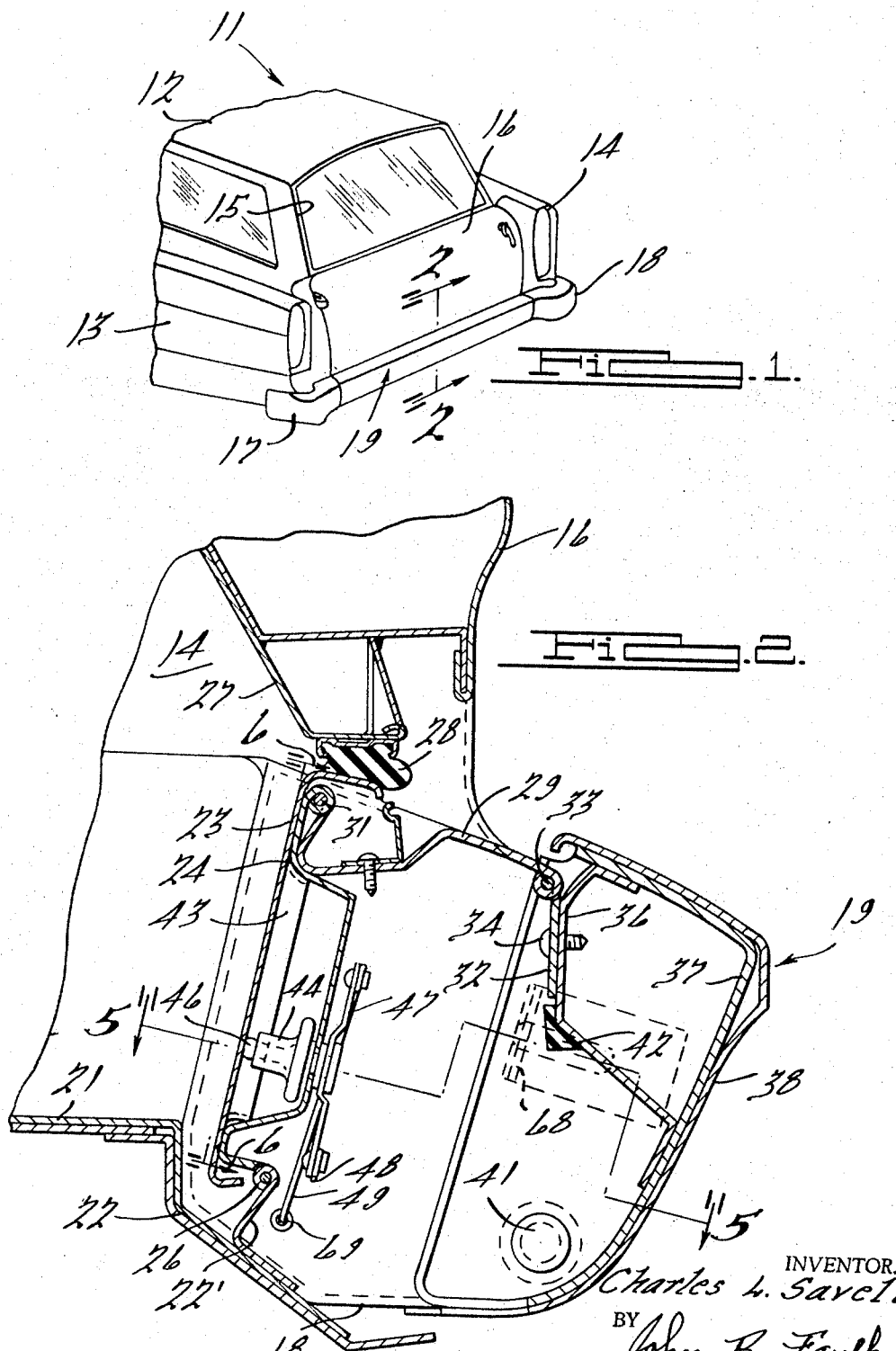

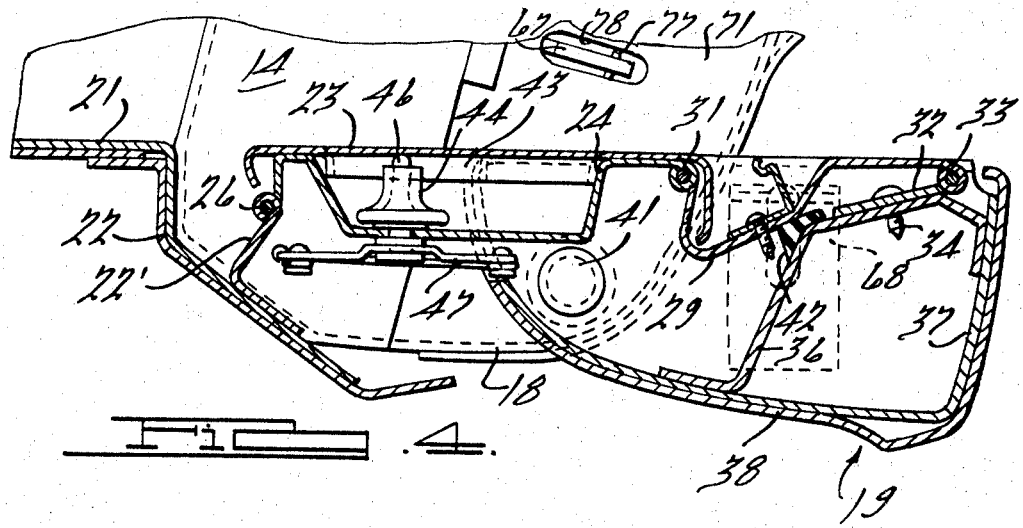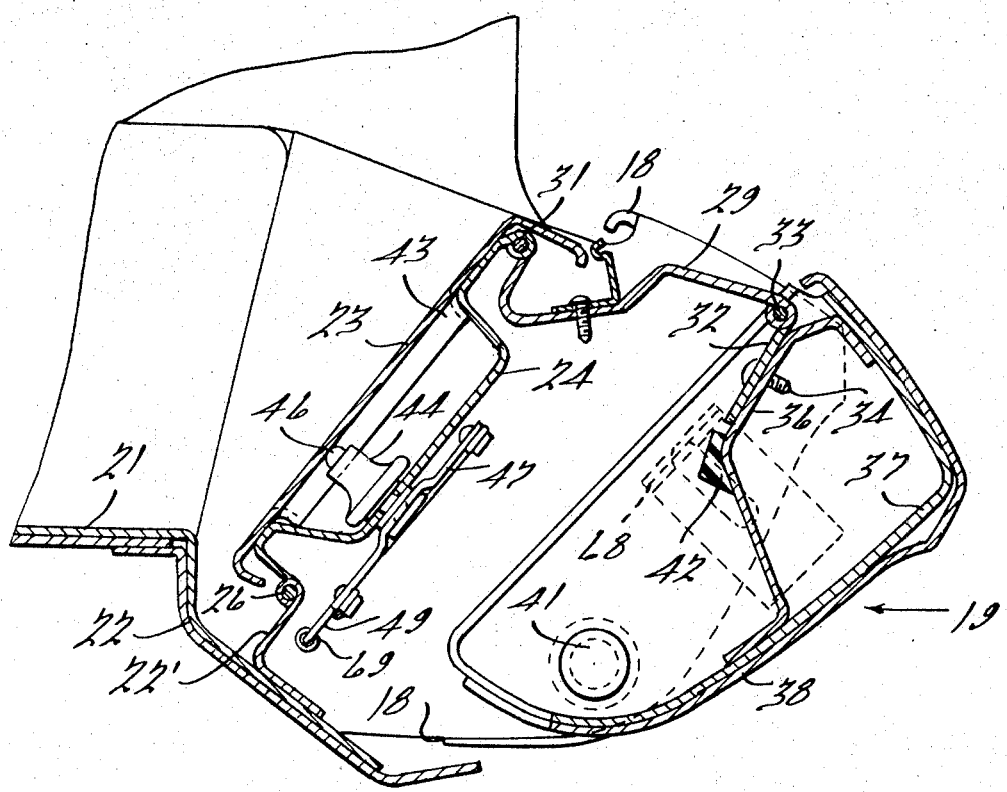

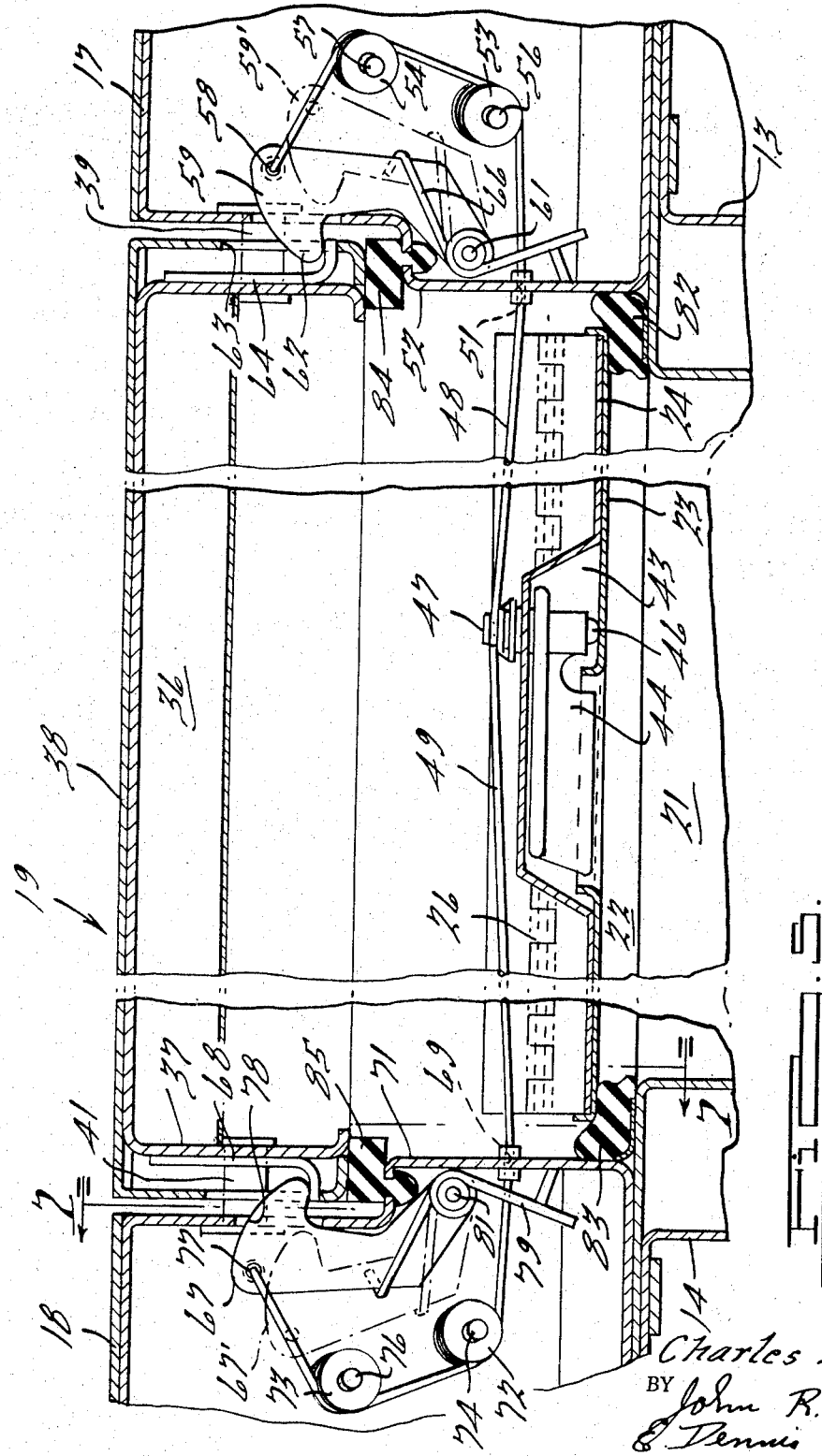

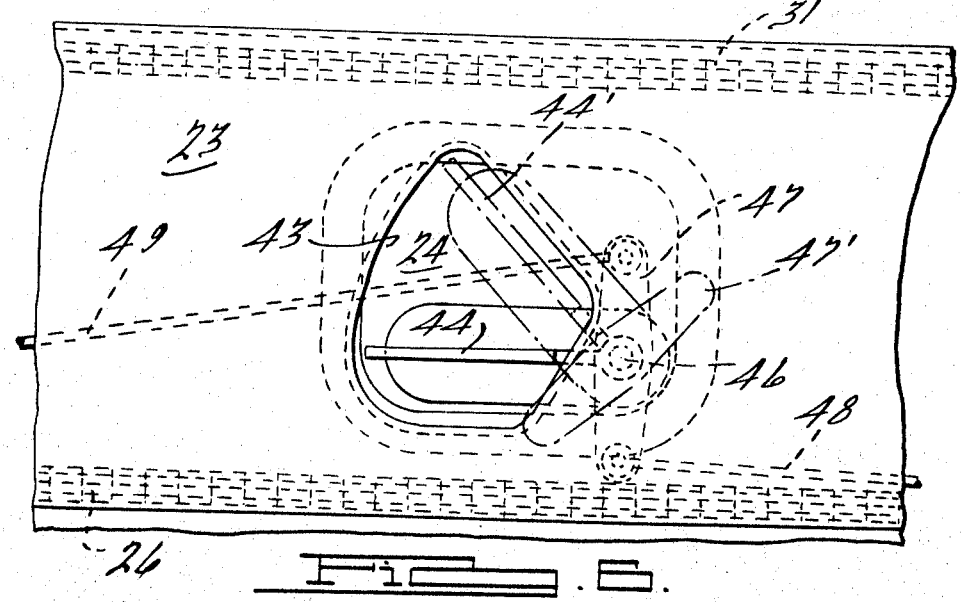
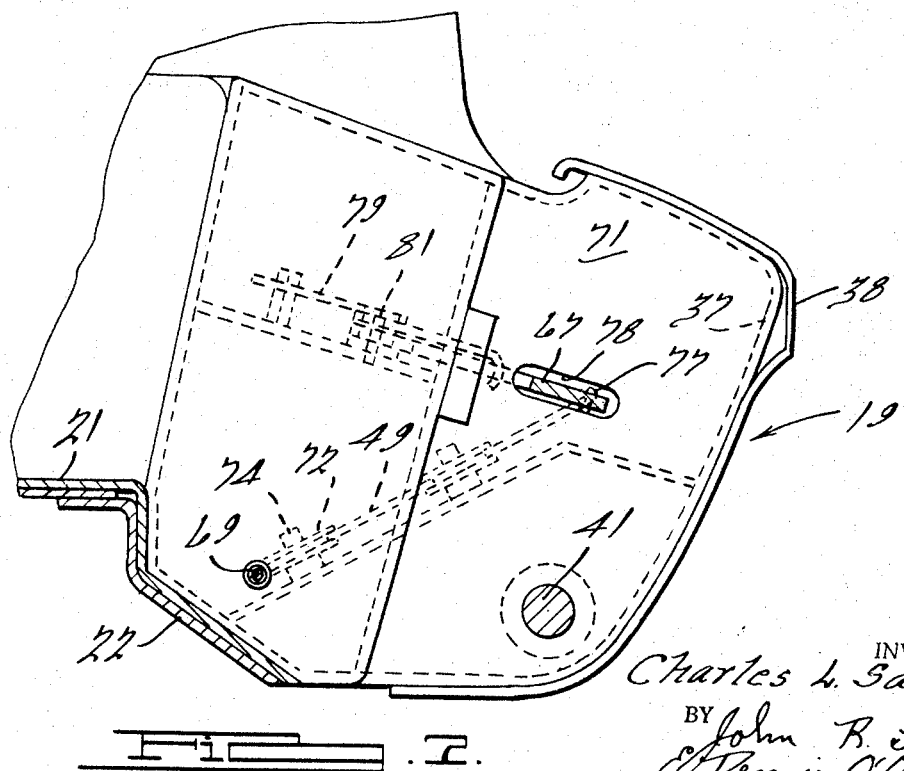

3,451,710
SHIFTABLE BUMPER
Charles L. Savell, Warren, Mich., assignor to Ford Motor Company, Dearborn, Mich., a corporation of Delaware
Filed June 30, 1967, Ser. No. 650,271
Int. Cl. B60r 19/02, 21/14
U.S. Cl. 293—73                                    7 Claims

ABSTRACT OF THE DISCLOSURE

A fold-down rear bumper pivotally secured to the body structure of a motor vehicle of the station wagon type. The bumper is swingable from a first, substantially upright position to a second position wherein the bumper is parallel to the floor of the vehicle cargo area, thereby facilitating access to a low profile cargo area.

Background of the invention

It is known that the utilization of a front wheel drive arrangement in a motor vehicle eliminates the necessity for drive train components extending towards the rear of the vehicle. In the case of a motor vehicle of the station wagon type, the elimination of these components allows the vehicle cargo space to have an extremely low profile with the cargo space floor member being from 4 to 6 inches above ground level. The current state of the art, however, does not allow optimum advantage to be gained from such a low profile cargo space because of the necessary inclusion of a protective rear bumper located beneath the tailgate. Such bumpers, in order to give the protection against impact for which they are designed, must extend above the height of the low profile cargo space floor. This arrangement necessitates lifting a load to be placed in or removed from the vehicle cargo space over the rear bumper, a clumsy and bothersome operation.

It is an object of this invention to provide a rear bumper structure for low profile cargo space vehicles which overcomes the disadvantages of the conventional bumper structures.

Summary of the invention

A fold-down rear bumper constructed in accordance with this invention is adapted for utilization in a motor vehicle of the station wagon type having body structure defining a cargo space and including a substantially horizontal cargo space floor member. The body structure also defines an aperture at the rear of the vehicle giving access to the cargo space. A closure member for this aperture is movably secured to the body structure. The fold-down rear bumper includes means pivotally secured to the body structure below the closure member and movable from a first position wherein a portion of the bumper extends vertically above the level of the floor member to give impact protection, to a second position wherein the upper extremities of the bumper do not extend vertically above the level of the floor member, thereby facilitating access to the cargo space.

Description of the drawings

FIG. 1 is an isometric view of a portion of a motor vehicle of a station wagon type illustrating a fold-down rear bumper constructed in accordance with this invention;

FIG. 2 is a sectional view taken along the line 2—2 of FIG. 1 and illustrating said bumper in the upright position;

FIG. 3 is a view similar to FIG. 2 but illustrating the fold-down rear bumper in a position part way between the upright and the horizontal position;

FIG. 4 is a view similar to FIG. 2 but illustrating the fold-down rear bumper in the horizontal position;

FIG. 5 is a sectional view taken along the line 5—5 of FIG. 2;

FIG. 6 is a sectional view taken along the line 6—6 of FIG. 2; and

FIG. 7 is a sectional view taken along the line 7—7 of FIG. 5.

Detailed description of the invention

Referring now in detail to the drawings and in particular to FIG. 1, the numeral 11 denotes a motor vehicle of a station wagon type having body structure including a roof 12, a left rear quarter panel 13, and a right rear quarter panel 14. This body structure defines a rear access opening 15 to the vehicle cargo space. Pivotally mounted for movement into and out of rear access opening 15 is a closure member or tailgate 16 that may be of the dual action type, that is, having both vertical and horizontal hinge axes. Below tailgate 16 is a rear bumper including end portions 17 and 18 that are fixedly secured to quarter panels 13 and 14, respectively, and having a midportion 19 that is swingable from an upright position to a position wherein its upper extremities are substantially parallel to the floor of the vehicle cargo space. It should be noted that the length of the bumper midportion 19 measured across the rear of the vehicle is at least as great as the dimension of the tailgate 16 measured across the rear of the vehicle.

FIGS. 2–5 illustrate the construction of bumper midportion 19 that allows the swinging movement described above. It may be seen from these figures of the drawings that vehicle 11 has a low profile cargo space area in that a cargo space floor member 21 is arranged in a substantially horizontal plane some distance below the lower extremity of tailgate 16. An inclined extension 22 extends to the rearward of the vehicle from cargo space floor member 21.

Swingable midportion 19 of the vehicle bumper includes an inner cover member 23 joined by welding, or other suitable joining techniques, to an inner structural member 24 that is pivotally joined by a piano hinge 26 to a projection 22′ extending from floor extension 22. Tailgate 16 includes an extension 27 projecting towards bumper midportion 19 and having mounted on the lower extremity thereof a seal 28 that is engaged by the upper extremity of inner cover member 23 when bumper midportion 19 is in the upright position illustrated in FIG. 2.

The upper extremity of inner structural member 24 is pivotally connected to a top structural member 29 by hinge pin 31. The end of upper structural member 29 remote from hinge pin 31 is connected by hinge pin 33 to a swinging member 32 that is joined by a fastener 34 to an outer structural member 36. The outer structural member 36 is joined to an outer cover member 37, that is joined to an outer trim member 38. The trim member 38 may be plated with chrome or other decorative material on its outer surface. As is best illustrated in FIG. 5 of the drawings, outer cover member 37 and outer trim member 38 are pivotally connected to stationary bumper end portions 17 and 18 by pivot pins 39 and 41, respectively.

Pivotal movement of the parts described above made possible by piano hinge 26, hinge pins 31 and 33 and pivot pins 39 and 41 allows bumper midportion 19 to be moved progressively from the position illustrated in FIG. 2 through the position illustrated in FIG. 3 to the lowered horizontal position illustrated in FIG. 4 wherein the upper extremities of bumper midportion 19, namely inner cover member 23 and upper structural member 29 lie in a straight line at substantially the same level as cargo space floor member 21. With bumper midportion 19 in this position, it readily may be appreciated that cargo easily may be loaded and unloaded from the cargo space of vehicle 11.

Furthermore, in the event it is desired to carry a load having greater length than the vehicle cargo space, tailgate 16 may be closed with bumper midportion 19 left in the position illustrated in FIG. 4 so that the overlength load described above may project beyond the normal confines of the vehicle cargo space area.

A rubber stop 42 is secured to outer structural member 36 and, when bumper midportion 19 is in the position illustrated in FIG. 4, contacts upper structural member 36 and, when bumper midportion 19 is in the position illustrated in FIG. 4, contacts upper structural member 36 and, when bumper midportion 19 is in the position parts of bumper midpostion 19 due to the force of gravity. Bumper midportion 19 is held in the upright position illustrated in FIG. 2 by a latch arrangement to be described below.

Inner cover member 23 has formed therein an aperture 42. Registering with aperture 43 is a latch handle 44 pivotally mounted on inner structural member 24 by a pivot pin 46. Also secured to pivot pin 46 for rotational movement therewith is a lever 47. Attached to the ends of lever 47 are latch actuating cables 48 and 49.

Actuating cable 48 extends from lever 47 through a hole 51 in the side wall 52 of stationary bumper end 17 and around a pair of pulleys 52 and 53 mounted for rotation on shafts 56 and 57 respectively, that are journalled in internal structural parts of bumper end portion 17. Cable 48 is attached at point 58, remote from lever 47, to a latch member 59. Latch 59 is pivotally mounted within stationary bumper end portion 17 on a shaft 61 and includes a hooked end 62 that registers with an aperture 63 in the side wall of decorative member 38. An L-shaped striker 64 is secured to the side wall of outer structural member 37 and is engaged by hooked end 62 of latch 59 when bumper midportion 19 is in the position illustrated in FIG. 2. The engagement between hooked end portion 62 of latch 59 and striker 64 is maintained by a spring 66 bearing on latch 59 and forcing it towards striker 64.

Cable 49 is arranged for actuation of a latch member located at the opposite extremity of bumper midportion 19 from latch member 59. Cable 49 actuates a latch member 67 that cooperates with a striker 68 joined to a side wall of outer structural member 37. Cable 49 extends through a hole 69 in side wall 71 of stationary bumper end portion 18 and around a pair of pulleys 72 and 73 mounted for rotation on pulley shafts 74 and 76, respectively. Pulley shafts 74 and 76 are journalled for rotation in an internal structural member of bumper end portion 18. The attachment of cable 49 to latch 67 is at point 77. Latch 67 extends through a hole 78 in side wall 71 of bumper end 18 in order that it may engage striker 68. A spring 79 engages latch 67 and maintains said latch in engagement with striker 68 when bumper midportion 19 is in the position illustrated in FIG. 2. Pivotal movement of latch member 67 is made possible by its mounting on pivot pin 81 journalled within bumper end portion 18.

The operation of the latch mechanism described above may best be seen from FIGS. 5, 6 and 7. When it is desired to release bumper midportion 19 for movement from the position illustrated in FIG. 2 to the position illustrated in FIG. 4, handle 44 is rotated into the position 44′ illustrated in ghost (FIG. 6). This movement of handle 44 causes a following movement of lever 47 into the position 47′ illustrated in ghost. This movement of lever 47 is transmitted via cables 48 and 49 to latch members 59 and 67, respectively. The cables exert a force on the latch members that overcomes the force exerted by springs 66 and 79 so that latch members 59 and 67 are urged into the ghost positions 59′ and 67′, respectively. When in the positions 59′ and 67′, the latch members are disengaged with strikers 64 and 68 and movement of bumper midportion 19 from the position illustrated in FIG. 2 is possible.

When bumper midportion 19 is returned to the upright position illustrated in FIG. 2, the strikers 64 and 68 contact the curved portions of the hooked ends of the latch members forcing the latch members towards the positions 59′ and 67′ so that strikers 64 and 68 may reach the positions illustrated in FIG. 5. At this time the force of springs 66 and 79 urges the latch members into engagement with the strikers to hold bumper midportion 19 as illustrated in FIGS. 2 and 5.

As may be seen from FIG. 5, elastomeric members 82 and 83 are secured to quarter panels 13 and 14, respectively, in order to provide a weather tight seal of the vehicle cargo area as well as to prevent rattles as these elastomeric members are engaged by inner cover member 23 when bumper midportion 19 is in the upright position.

A pair of elastomeric energy absorbing members 84 and 85 are secured to side walls 52 and 71 of stationary bumper end portions 17 and 18, respectively. In the event of an impact force being applied to decorative member 38, energy absorbing members 84 and 85 act to ameliorate the shock caused by said impact and transmit a portion of this shock to bumper end portions 17 and 18 that are, as explained above, joined to the structural components of the vehicle.

It may be seen from the foregoing that this invention provides a fold-down rear bumper for a motor vehicle of the station wagon type having a low profile cargo space area. The fold-down rear bumper is movable from an upright position wherein it extends above the level of the cargo space floor to provide the requisite protection during impact to a second position wherein the upper extremities of the fold-down bumper are substantially equal in height to the cargo space floor member, thereby facilitating movement of cargo into and out of the cargo space.

It is to be understood that this invention is not limited to the exact construction illustrated and described above, but that various changes and modifications may be made without departing from the spirit of the invention as defined by the following claims.

I claim:

1. In a motor vehicle of the station wagon type, body structure defining a cargo space and including a substantially horizontal cargo space floor member, said body structure also defining an aperture at the rear of said vehicle giving access to said cargo space, a closure member for said aperture secured to said body structure, rear bumper means pivotally secured to said body structure below said closure member and having a first position and a second position, said bumper means comprising a first member pivotally secured to said body structure in a substantially upright orientation and extending above the plane of said floor member in said first bumper means position and a second member pivotally secured to said first member and angularly inclined thereto in said first bumper means position, said first and second members lying in the same plane as said cargo space floor member to form an extension of said floor member when said bumper means are in the second position.

2. The combination of claim 1, wherein said bumper means includes a third member pivotally secured to said second element in a substantially upright orientation in said first bumper means position, said third member lying in a plane parallel to the plane of said cargo space floor member in the second bumper means position.

3. The combination of claim 1, wherein a portion of said bumper means is spaced rearwardly of said body structure when said bumper means are in the first position, and resilient means operatively secured to said body structure and interposed between said body structure and said bumper means and transmitting at least a portion of a force applied to the latter to the former.

4. The combination of claim 1, wherein a portion of said bumper means is in weather sealing engagement with said closure member when said bumper is in the first position.

5. The combination of claim 1, including manually operable cooperating latching means operably carried by said body structure and said bumper means and capable of securing said bumper means in the first position.

6. In a motor vehicle of the station wagon type, body structure defining a cargo space and including a substantially horizontally planar cargo space floor member, said body structure also defining an aperture at the rear of said vehicle giving access to said cargo space, a movable closure member for said aperture secured to said body structure, a composite rear bumper secured to said body structure below said closure member, the end portions of said bumper being secured against movement to said body structure, the midportion of said bumper extending between said end portions being pivotally secured to said body structure and movable from a first position to a second position, the midportion of said bumper comprising a first member having a substantially upright position in said first bumper position and a second member pivotally secured to said first member and angularly inclined thereto in said first bumper position, said first and second members lying in the same plane as said cargo space floor member and forming an extension thereto in said second bumper position.

7. The combination of claim 6, wherein the length of said midportion of said bumper is at least as great as the width of said closure member measured across the rear of said vehicle.

References Cited

UNITED STATES PATENTS

| | | | |
|---|---|---|---|
| 1,562,694 | 11/1925 | Farum | 293—73 XR |
| 2,230,516 | 2/1941 | Radtke | 293—73 XR |
| 2,717,798 | 9/1955 | Dodt et al. | 293—73 XR |
| 2,796,287 | 6/1957 | Moyes | 293—69 |
| 3,173,717 | 3/1965 | Peras | 293—73 |

ARTHUR L. LA POINT, *Primary Examiner.*

HOWARD BELTRAN, *Assistant Examiner.*

U.S. Cl. X.R.

224—42.05; 293—88, 99; 296—50